(12) United States Patent
Larab et al.

(10) Patent No.: US 8,056,057 B2
(45) Date of Patent: Nov. 8, 2011

(54) SYSTEM AND METHOD FOR GENERATING BUSINESS PROCESS TEST ELEMENTS

(75) Inventors: Bassam A. Larab, San Jose, CA (US); Hector A. Arteaga, Saltillo (MX); Osvaldo F. Solis, Saltillo (MX); Guillermo E. Riojas, Saltillo (MX); Maria A. Cuandon, Saltillo (MX); Ryan C. Horton, Saint Louis, MO (US); Michael K. Chiou, Diamond Bar, CA (US); Vaughn A. N. Paladin, San Jose, CA (US)

(73) Assignee: SAP AG, Walldorf (DE)

( * ) Notice: Subject to any disclaimer, the term of this patent is extended or adjusted under 35 U.S.C. 154(b) by 1472 days.

(21) Appl. No.: 11/511,984

(22) Filed: Aug. 28, 2006

(65) Prior Publication Data

US 2007/0089091 A1    Apr. 19, 2007

Related U.S. Application Data

(63) Continuation-in-part of application No. 11/251,281, filed on Oct. 13, 2005, now Pat. No. 7,752,607.

(51) Int. Cl.
G06F 9/45 (2006.01)
(52) U.S. Cl. ..................................... 717/124
(58) Field of Classification Search .................. 717/124
See application file for complete search history.

(56) References Cited

U.S. PATENT DOCUMENTS

| | | | |
|---|---|---|---|
| 6,257,774 B1 | 7/2001 | Stack | |
| 6,601,233 B1 | 7/2003 | Underwood | |
| 6,810,494 B2 | 10/2004 | Weinberg et al. | |
| 6,907,546 B1 | 6/2005 | Haswell et al. | |
| 2002/0083213 A1 | 6/2002 | Oberstein et al. | |
| 2005/0149868 A1 | 7/2005 | Katayama et al. | |
| 2006/0010163 A1 | 1/2006 | Herzog et al. | |

OTHER PUBLICATIONS

Final Office Action for U.S. Appl. No. 11/251,281, Mailed Jul. 24, 2009, 27 pages.
International Search Report & Written Opinion mailed May 15, 2008 for International Application No. PCT/US06/40390.
Non-Final Office Action dated May 8, 2008 for U.S. Appl. No. 11/251,281.
Final Office Action mailed Sep. 19, 2008 for U.S. Appl. No. 11/251,281.

(Continued)

*Primary Examiner* — John Chavis
(74) *Attorney, Agent, or Firm* — Blakely Sokoloff Taylor & Zafman (57) ABSTRACT

Systems and methods are provided for generating business process test elements for automated testing of business process application configurations. A business process application executes business processes, which are typically automated operations involving users and information systems, and are typically specific to a type of business. A business process test is a set of instructions for invoking a business process. The test invokes one or more test elements, which are building blocks that codify interactions with business processes. Each element includes a description of the input data accepted by an associated transaction or screen of the business process. The element can receive input from a user or simulated user via an input interface of the application, and can invoke the associated business process with the input. The element is generated based upon metadata information retrieved from the business process application. The element provides input to and retrieves output from the application for the associated business process. The element refers to fields of the business process transactions or screens by names associated with the fields. The names may be internal application names, which are independent of a particular language.

12 Claims, 8 Drawing Sheets

OTHER PUBLICATIONS

Non-Final Office Action for U.S. Appl. No. 11/251,281, Mailed Jan. 22, 2009, 24 pages.
Notice of Allowance for U.S. Appl. No. 11/251,281, Mailed Feb. 22, 2010, 10 Pages.
Non-Final Office Action for U.S. Appl. No. 11/868,897, Mailed Jul. 29, 2010, 14 Pages.
Notice of Allowance and Fee for U.S. Appl. No. 11/868,897, Mailed Jan. 7, 2011, 7 Pages.
U.S. Appl. No. 11/251,281, filed Oct. 13, 2005, for Bassam A. Larab et al.

SYSTEM AND METHOD FOR GENERATING BUSINESS PROCESS TEST ELEMENTS

CROSS-REFERENCE TO RELATED APPLICATIONS

This application is a Continuation-in-part of Application Ser. No. 11/251,281, filed Oct. 13, 2005, the contents of which are expressly incorporated herein by reference in their entirety.

BACKGROUND OF THE INVENTION

The invention relates generally to testing of software, and more specifically to systems and methods for automated testing of software that executes business processes.

Business process application software allows for the definition and execution of business processes in a computer system. Examples of business processes include updating customer information, receiving and fulfilling orders, synchronizing customer information stored on multiple computer systems, and generating a price quote. Business processes are often associated with data descriptions and transformation rules for accessing individual data items, such as a customer name or a unit price. A business process specifies a sequence of activities to be performed in a specified order, and may specify conditional and repeated execution of activities. Business process application software can execute a business process, prompting for or retrieving input data as needed, and produce results or effects, such as output data or execution of database transactions. A business process application configuration includes a set of business processes and associated data, including data descriptions and transformation descriptions, which specify how to execute one or more particular business processes using general-purpose business process application software, such as SAP™ or Siebel™. Configuration information is typically represented as data stored in disk files or in an online repository, depending on the particular business process application software. The business process software can load the configuration information, including the business process, and subsequently execute the business processes. For example, a shipping company may have a business process application configuration including a computer system running SAP™ software with a ShipmentReceived business process, which is to be executed when a shipping container arrives at a transit hub. The ShipmentReceived business process updates an inventory database of shipping container locations and invokes another computer system to route the shipping container to its destination. The shipping company may have a second business process application configuration consisting of another computer system running Siebel software with a ConfirmOrder business process, which is to be executed when an order has been processed. The ConfirmOrder business process, which is invoked by an order processing system, retrieves the customer's e-mail address from Siebel and sends an e-mail notice to the customer describing the order.

It is desirable to be able to automatically test the execution of a business process application configuration by a business process application for correctness. Testing a software program involves interacting with the program in a test environment and verifying that the program operates correctly, based on the program's behavior in response to input supplied during the interaction. The interaction may be manual testing performed by a human or automated testing performed by a test program. Automated testing is desirable because human effort is not necessary to perform the testing, so automated testing can be less expensive and more consistent than manual testing, once the tests have been developed. However, substantial time and effort may still be involved in creating the tests, which are typically computer programs, that will perform the automated testing. Test automation systems, which are typically computer programs, have been developed to reduce the time and effort involved in creating automated tests.

Co-pending U.S. patent application Ser. No. 11/251,281, System And Method For Testing Business Process Configurations, B. Larab, et al., discloses systems and methods for testing business process configurations, in which the testing is based upon complex test elements, which interact with specific screens or transactions of a specific application, e.g., SAP™ or Siebel™, to provide input data and read output data from the application. A complex test element includes a parameter list, which describes the names and types of input and output parameters that are expected and produced, respectively, by the transaction, and a list of elements to be invoked to perform the transaction. The complex test element passes values received from the user for the input parameters to the transaction when the test is executed, and passes values produced by the transaction back to the testing system so that the user can verify that the test's output is correct, or perform an action based upon the test's output. The test elements can be used as building blocks to create automated tests. For example, a user may select a test element associated with a specific Purchase Order transaction, add the element to a test, and provide input data for the element. The test automation system can then execute a test of the Purchase Order transaction using the element and input data. Multiple test elements can be strung together in a sequence to create tests of multiple features, e.g., multiple transactions, and test elements that perform conditional branching can be used to create tests that execute certain elements conditionally or repeatedly. An element that performs an application-specific action, such as a transaction, is created by combining simpler elements that perform actions such as setting or getting a value of a text field or selection box in an application user interface. For example, an element that performs a Purchase Order transaction could be created by combining elements that set the values of each field of the Purchase Order transaction in a user interface. If the Purchase Order transaction includes input fields for an item name and quantity, the Purchase Order element would be able to indicate to a user of the testing system that an item name and a quantity are expected as input parameters to the transaction. The Purchase Order element would also be able to invoke field setting elements that set the item name and quantity input fields to parameter values provided by a user of the test automation system.

Test elements can be created manually by a user interacting with the testing system. To create a new test element for a transaction, the user first perceives the format of the input data, i.e., the names and types of the input fields of the transaction. Then the user may add field setting elements to the new test element to set values of the transaction's input fields. The user may also add field getting elements to retrieve output values produced by the transaction. The test element can then be used by the testing system to invoke the transaction. For example, a user could create a Purchase Order test element by first looking at the Purchase Order transaction screen or documentation to determine that the purchase order transaction's input includes an item name and a quantity. The user would then create an empty complex element and add field setting elements for the item name and quantity fields to the empty complex element. The Purchase Order test element could then be included in business process tests to invoke the Purchase Order transaction.

This manual process of creating test elements can be resource-intensive and error-prone because it depends on a human user. A human user may make mistakes or omissions in creating the test elements, and the time taken by a human user to create test elements for an application may be substantial and costly. An application may have hundreds or thousands of possible transaction screens or types, in which case the expense and possibility of error may be substantial.

One way to automate the test creation process is to introduce a recording feature, in which the test system records the user's actions when a transaction screen is filled in. However, this approach sometimes can lead to difficulties, such as tests being overly dependent upon details of the application screens or the version of the application, as described in the above-referenced patent application Ser. No. 11/251,281.

Furthermore, the manual process of creating a test element generally produces test elements that are dependent on the particular language version (e.g., English or Japanese) of the application, because the descriptive text associated with each field on the application screen is used to identify the field in the test elements. If the descriptive text changes, for example, as a result of switching from an English-language version of the application to a Japanese-language version, then the test element will become inoperable. The descriptive text may also change for other reasons, e.g., if the application vendor changes the text in a new version of the application.

Because of the resource-intensive, error-prone, and language-dependent nature of the manual process for generating test elements, it would be desirable to be able to automatically generate test elements.

SUMMARY OF THE INVENTION

In general, in a first aspect, the invention features, in a business-process test environment, a method of generating a business process test element for testing a business process transaction provided by a business process application. The method comprises acquiring a description of a transaction field from a component of the business process application, wherein the description comprises a name and a type of the field, generating an instruction for setting a field value associated with the field to an input value, wherein the input value is acquired by the instruction when the instruction is executed, and wherein the instruction is based upon the name and the type.

Embodiments of the invention may include one or more of the following features. Acquiring a field description may comprise extracting a user interface object from an application screen, wherein the user interface object corresponds to the transaction field; and determining the name and the type based upon the user interface field. The user interface object may comprise a text box, list box, drop down, check box, radio box, or a combination thereof. Acquiring a field description may comprise retrieving metadata associated with the business process application, wherein the metadata describes the transaction; and determining the name and the type based upon the metadata. Generating instructions may comprise acquiring a display label from the description of the transaction field, wherein the display label is associated with a user interface object that corresponds to the transaction field, establishing an association in an object definition list between the name and the display label; wherein generating an instruction comprises: generating an instruction for providing the input value to the user interface object, wherein the display label identifies the user interface object. A data file or a spreadsheet may provide the input value. Generating an instruction may further comprise generating an instruction for retrieving a current value of the transaction field.

The method of generating a business process test element may further comprise importing the business process test element into a business process test environment to make the test element available for invocation by business process tests. The method of generating a business process test element may further comprise updating a spreadsheet to reference the transaction field by linking a spreadsheet cell to the transaction field In general, in a second aspect, the invention features a method of loading test elements into a business process test environment, the test elements for invoking business process application transactions. The method of loading test elements comprises extracting metadata from a business process application, wherein the metadata describes at least one business process transaction, generating at least one business process test element for setting a value associated with at least one field of the at least one business process transaction, and importing the business process test element into the business process test environment to make the test element available for use in business process tests.

Embodiments of the invention may include one or more of the following features. The method of loading test elements may further comprise invoking a programmatic interface of the business process application to retrieve the metadata from a database associated with the business process application. Extracting metadata may comprise invoking a programmatic interface to identify user interface features on a transaction screen of the business process application, wherein the screen comprises a user interface input feature that corresponds to the transaction field, and determining a name and a type of the at least one field. Converting may comprise retrieving from the metadata description at least one label associated with the at least one field, generating a script, wherein generating a script comprises generating computer program instructions for selecting at least one user interface feature associated with the at least one field, wherein selecting is based upon the at least one label, and generating computer program instructions for setting the value associated with the at least one user interface feature to a new value, and storing the computer program instructions in association with the at least one business process test element.

The method of generating test elements may further comprise generating an object definition list that associates at least one name of the at least one field with at least one label of the at least one field, and importing the object definition list into the business process test environment. Importing the business process test element may further comprise invoking a programmatic interface of the business process test environment to store the element in a database associated with the business process test environment.

In general, in a third aspect, the invention features a system for generating a business process test element for testing a business process transaction in a business process test tool. The system comprises a field acquirer to acquire a description of a transaction field from a component of the business process application, wherein the description comprises a name and a type of the field; and an instruction generator to generate an instruction for setting a field value associated with the field to an input value, wherein the input value is acquired by the instruction when the instruction is executed, and wherein the instruction is based upon the name and the type.

In general, in a fourth aspect, the invention features a computer program product comprising program code for generating a business process test element for testing a business process transaction provided by a business process application. The computer program product comprises program code operable to acquire a description of a transaction field from a component of the business process application, wherein the description comprises a name and a type of the field; and program code operable to generate an instruction for setting a field value associated with the field to an input value, wherein the input value is acquired by the instruction when the instruction is executed, and wherein the instruction is based upon the name and the type.

In general, in a fifth aspect, the invention features a computer program product comprising program code for loading test elements into a business process test environment, the test elements for invoking business process application transactions. The computer program product comprises program code operable to extract metadata from a business process application, wherein the metadata describes at least one business process transaction, program code operable to generate at least one business process test element for setting a value associated with at least one field of the at least one business process transaction, and program code operable to import the business process test element into the business process test environment to make the test element available for use in business process tests.

DETAILED DESCRIPTION OF THE EMBODIMENTS

The following description is presented to enable any person skilled in the art to make and use the invention, and is provided in the context of particular applications and their requirements. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the present invention is not intended to be limited to the embodiments shown, but is to be accorded the widest scope consistent with the principles and features disclosed herein.

Figure 1A:
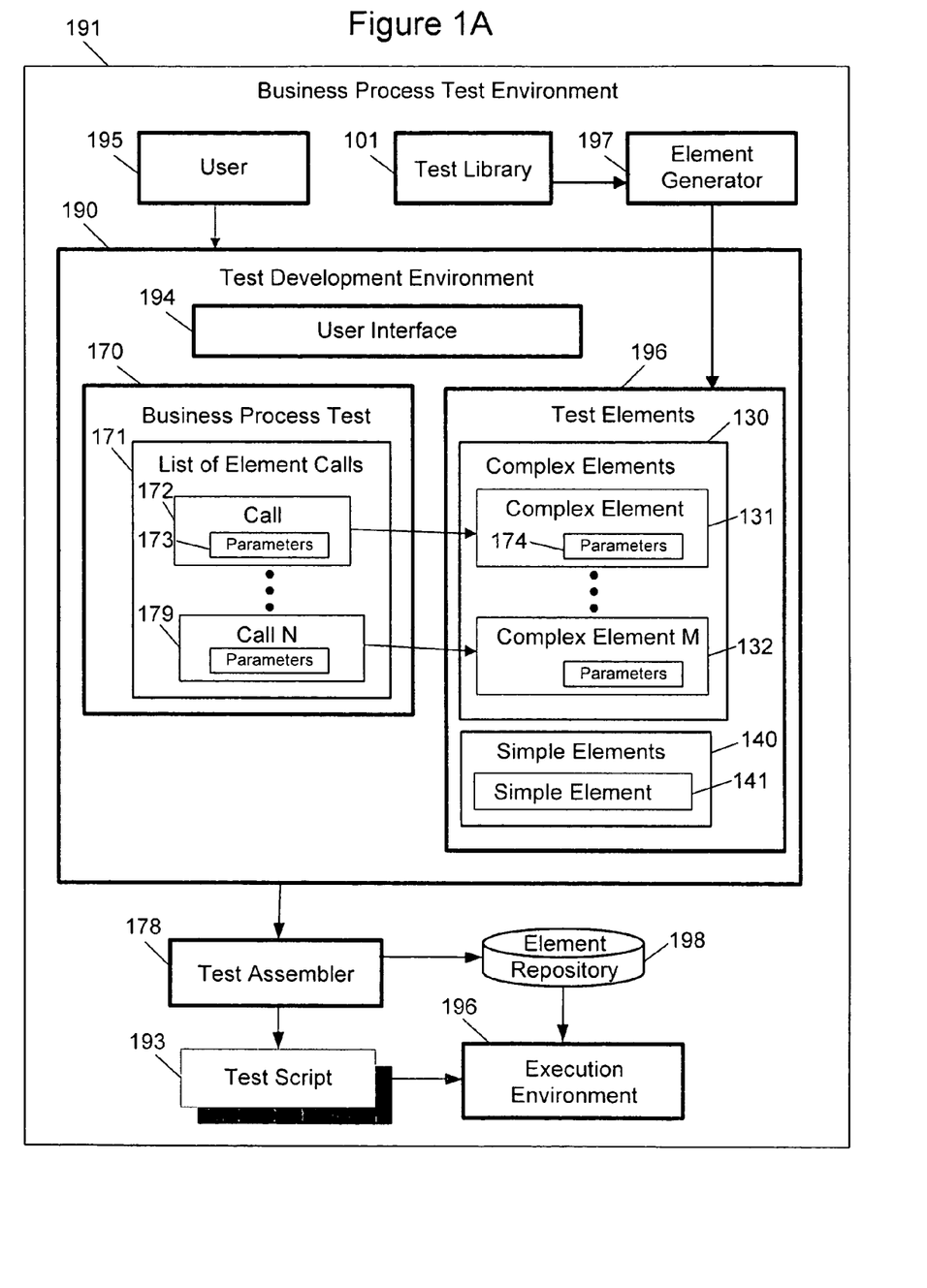
FIG. 1A is an illustrative drawing of a business process test environment according to some embodiments of the invention.

FIG. 1A is an illustrative drawing of a business process test environment 191 according to one embodiment of the invention. The business process test environment 191 is computer program code in a computer system such as that shown in FIG. 4. The business process test environment 191 includes a test development environment 190, a set of test elements 196, and a test execution environment 196. The business process test environment 191 may be provided in part by, for example, Quality Center™ from Mercury Interactive Corporation of Mountain View, Calif.

The test elements 196 represent particular features, e.g., particular transactions, of the business process application, and can invoke those features automatically when included in a business process test 170. The test elements 196 may be generated by an element generator 197, as described below. The test elements 196 enable the business process test environment 191 to programmatically invoke features of a business process application by interacting with the application's user interface, thereby simulating a user's interaction with the business process application, and enabling automated testing of the business process application via the application's user interface. In some cases, testing via the user interface is employed, especially where no programmatic application programming interface is provided by the application. Furthermore, testing via the user interface allows for verification of the proper operation of the user interface and underlying application features presented to users. Efficient generation of tests for user interfaces and underlying application features, as described herein, contributes to efficient development of automated tests. Once automated tests have been developed, such tests are significantly more efficient and reliable than tests performed manually by human testers.

The development environment 190 interacts with the user 195 and receives commands from the user 195 for creating a business process test 170. A user 195 may create a business process test 170 to test particular features of a business process application. In one aspect, the user 195 creates the test 170 by selecting test elements 196 that correspond to the features to be tested. For example, the user 195 may select a complex element 131 that invokes a Create Sales Order transaction, and a complex element 132 that invokes a Create Purchase Order transaction. A separate test element is ordinarily generated for each user interface feature, because each feature may have different properties, e.g., different types of associated data values, different input parameters, and the like. The test elements 196 may be stored in a single data file, in multiple data files, or in other data formats. The test 170 may also include instructions for verifying that the results returned by the application, e.g., the output values of a transaction, are correct.

The test 170 ordinarily includes a list of element calls 171. Each entry in the list of element calls 171 is an element call 172, which may include parameters 173 that provide input values for the element call 171. The element call 172 invokes a particular feature of the business process application, and passes the parameters 173 as part of the invocation. The element call 172 may include at least one code statement for invoking the particular feature. The code statement may be, for example, a statement in a programming language such as VBScript™ or the like. The element call 172 may also invoke computer program code that is stored in a test library 101 to perform more generalized operations, such as sending a data value to the application, or retrieving an output value from the application. In one aspect, the business process test 170, i.e., the particular sequence of element calls 171, is processed by a test assembler 178, which combines the business process test 170 with other components, such as the test library 101, to produce a test script 193. The test script 193 may be executed by a test executive 196. The test executive196 may provide user interface features that allow the user 195 to interact with the executing test.

The user 195 may create at least one business process test 170 by selecting individual elements from a set of test elements 196. The user interface 194, e.g., a graphical user interface, displays visual representations of the business process test 170 and the list of elements 196. The user interface 194 allows a user 195 to select elements from a list of test elements 196, thereby adding the selected elements to the business process test 170. The action of selecting elements can involve, for example, dragging and dropping graphical representations of selected elements from the list of test elements 196 to a graphical representation of the list of element calls 171, thereby creating an element call 172 in the list of element calls 171, where the element call 172 is able to invoke, i.e., call, the selected element when the test script 193 is executed, as described below. For example, an element that performs a Create Sales Order transaction could be selected from the list of test elements 196, and a corresponding element call 172 would be added to the list of element calls 171 each time the Create Sales Order element is selected. The list of element calls 171 may include (i.e., contain or refer to) at least one element call 172. The element call 172 and an optional element call N 179 are shown in FIG. 1A to illustrate that the list of element calls 171 may include more than one element call. The presence of the element call N 179 is meant to indicate that the list of element calls 171 includes N element calls, which may be numbered 1 through N.

The test elements 196 include two types of elements, simple elements 140 and complex, elements 130, which are invoked by business process tests to test a business process application. The simple elements 40 elements may invoke the business process application to perform actions such as submitting a transaction, selecting a transaction, or entering an input value. The complex elements 130 can invoke the simple elements 140 and can also invoke other complex elements 130. A business process test 170 can invoke both complex elements 130 and simple elements 140.

Each element call in the list of element calls 171 may be a call to any element in the list of test elements 196. The diagonal lines show that the element call 172 may call a complex element M 132, and the element call N 179 may call a complex element 131, for example. The diagonal lines illustrate two possible associations. Any other association of element calls to elements is possible, i.e., any element call in the list of element calls 171 can call any element in the test elements 196.

One or more of the complex elements 130 can be created manually, i.e., by the user 195, performing a series of interactions with the user interface 194, or created automatically by the element generator 197. The simple elements 140, which include at least one simple element 141, typically invoke associated computer program code functions and therefore are typically created by programmers. The complex elements 130 include, in one aspect, invocations of other elements. A complex element 131 can be created by a user. The user creates the complex element 131 by defining a list of other complex or simple elements to invoke, i.e., call. In one aspect, that list defines the behavior of the complex element 131.

The complex elements 130 may be a set or a list, or similar data structure, which contains or refers to at least one complex element 131. The complex element 131 and a complex element M 132 are shown in FIG. 1A to illustrate that the complex elements 131 may include more than one complex element. The presence of the complex element M is meant to indicate that the complex elements 130 include M elements, which may be numbered 1 through M.

Each complex element 131 includes formal parameters 174, which accept data values from business process tests. A formal parameter may be, for example, a sold-to party name or a purchase order number. The term "actual parameter" is used herein to refer to a value, such as a number or a string of text characters, which is associated with a test element call and is passed to a test element when the test element is invoked. The term "formal parameter" is used herein to refer to a variable which is associated with a test element, has an associated name, and can receive values of actual parameters from a test element call when the test element is invoked.

Each element call 172 can provide actual parameters 173 for formal parameters 174. The simple elements 140 may be a set or a list, or similar data structure, which contains or refers to at least one simple element 141.

At least one of the test elements 196 is generated by the element generator 197. Some of the test elements 196 may be generated manually by the user 195 or by a human programmer (not shown), using information about the business process application's interface for a particular interaction or transaction. Each of the test elements 196 typically transfers data to and from the business process application. The data to be transferred to the business process application may be provided when the element call 172 is created or modified, in which case the data is provided by the user 195 or by the element generator 197. The data to be transferred can also be provided when the script 193 is executed, in which case the data may be taken from, for example, a spreadsheet application. Each element 196 may retrieve output data from the business process application, such as error status or data generated by the transaction. Examples of test elements 196 include a Create Sales Order element, which can create a sales order transaction and set the input fields of the sales order transaction to specific values or to values provided when the script 193 is executed. The Create Sales Order element may also verify that the sales order was successfully created by checking the output of the application.

The test elements 196 may be stored in a test library 101.

The test assembler 178 converts the business process test 170 into the test script 193. The test script 193 can perform, i.e., execute, the business process test 170 by invoking a business process application, as described below. The test script 193 includes computer program code in a programming language similar to Visual Basic™ and can be stored in a file for later use, or for use by other testing systems.

Figure 1B:
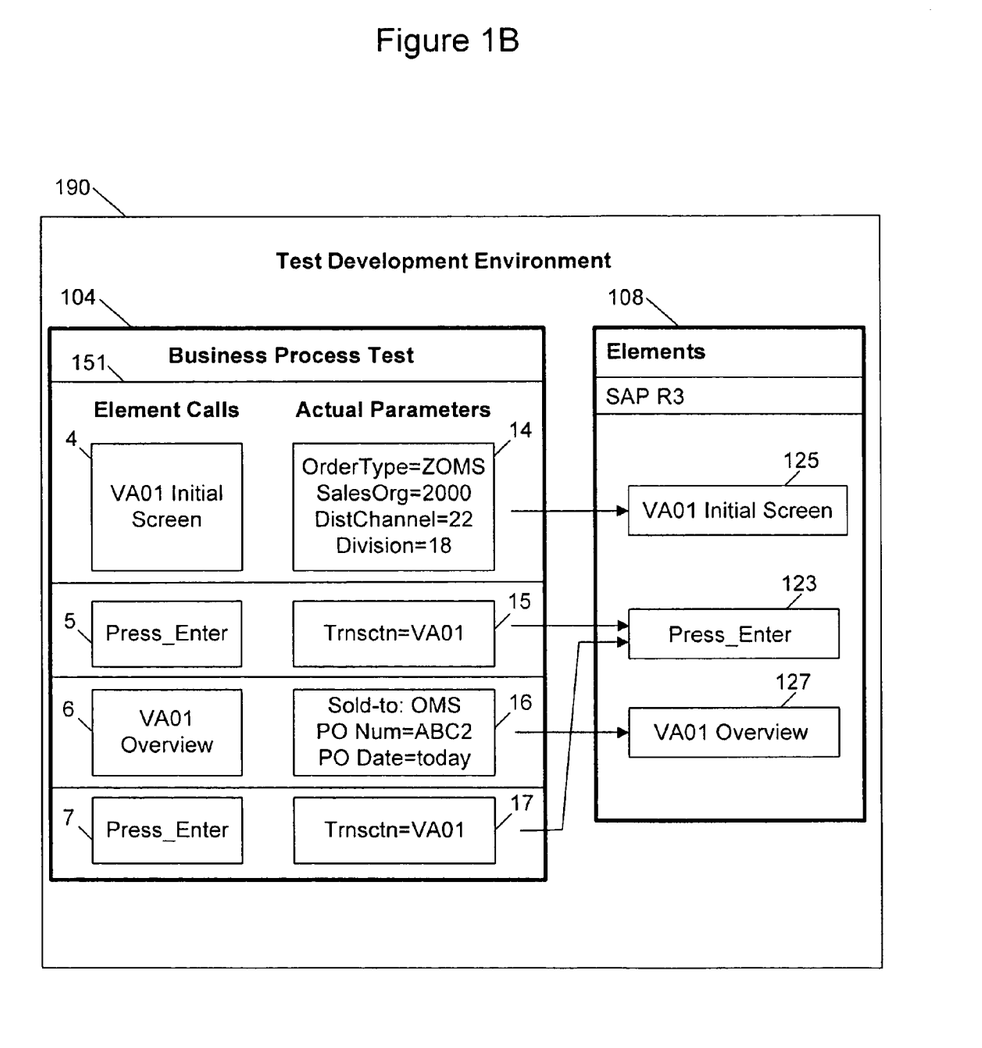
FIG. 1B is an illustrative drawing of element calls according to some embodiments of the invention.

FIG. 1B is an illustrative drawing of element calls according to one embodiment of the invention. A test development environment 190 includes a business process test 104 and test elements 108. The business process test 104 includes an ordered list of element calls 151, such as a VA01 Initial Screen element call 4, and associated actual parameters, such as a Transaction=A11 actual parameter 15 associated with the VA01 Initial Screen element call 4. Each of the element calls 151 refers to one of the test elements 108. The element call can invoke, i.e., call, the test element. The invocation may occur as part of execution of the business process test 104.

Execution of the business process test 104 occurs, for example, as part of execution of the test script 193 of FIG. 1A by a computer.

Referring to FIG. 1A, as previously stated, a user 195 may provide values for the actual parameters 173 of an element call 172. The values will be passed to the formal parameters 174 of the test element 131 when the business process test 170 is executed.

Referring again to FIG. 1B, the example test elements 108 include a Press_Enter test element 123, which generates a key press event that simulates a user pressing the Enter key, and test elements for filling in field values in a Create Sales Order transaction, such as an Initial Screen test element 125 and an Overview test element 127, which fill in values for an Initial Screen and an Overview screen, respectively, of the Create Sales Order transaction.

The example element calls 151 include, in order, a VA01 Initial Screen element call 4, which has a associated actual parameters 14 and is configured to invoke a VA01 Initial Screen test element 125, a Press_Enter element call 5, which has an associated actual parameter 15 and is configured to invoke the Press_Enter test element 123, a VA01 Overview element call 6, which has an associated actual parameters 16 and is configured to invoke the VA01 Overview test element 127, and a Press_Enter element call 7, which has an associated actual parameter 17 and is configured to invoke the Press_Enter test element 123.

Figure 2:
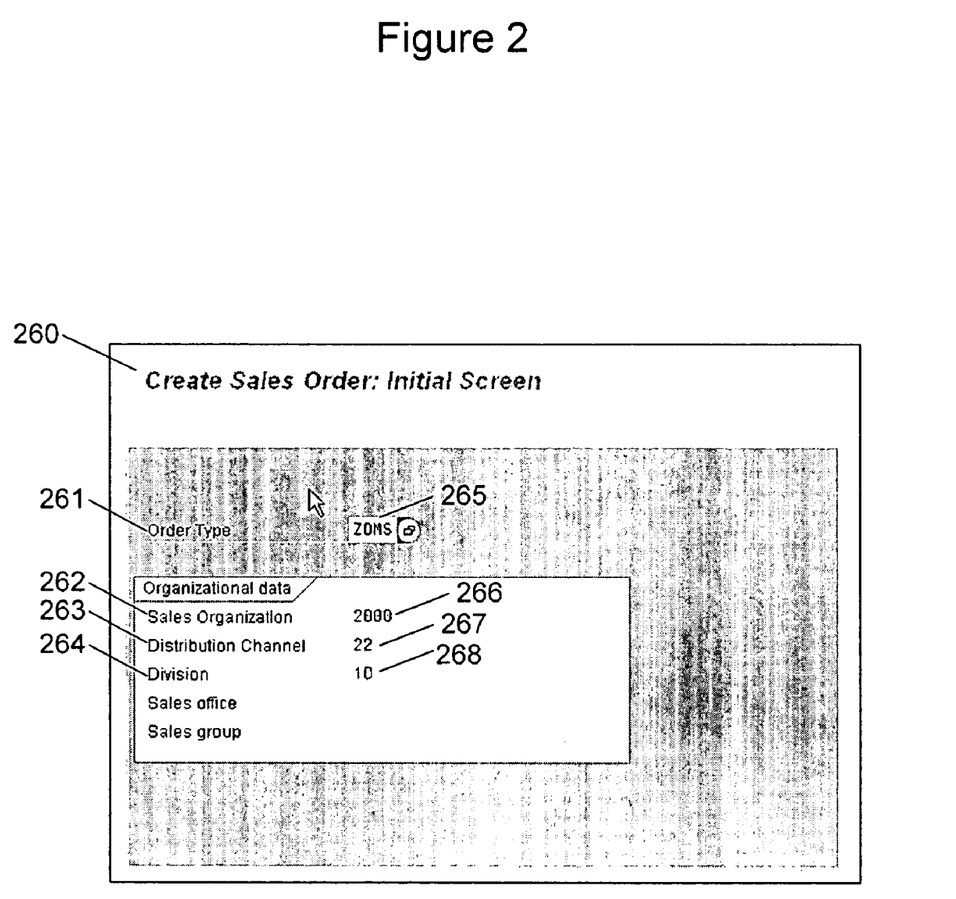
FIG. 2 is an illustrative drawing of an application transaction screen with data values filled in according to some embodiments of the invention.

FIG. 2 is an illustrative drawing of an application transaction screen with data values filled in according to one embodiment of the invention. The Create Sales Order Initial Screen transaction 260 is a transaction screen of the SAP™ business process application. The fields of the transaction screen 260 have been filled in by execution of a business process test script. In particular, the fields have been filled in with the actual parameter values 14 of the VA01 Overview element call 6 of FIG. 1B. The actual parameter values 14 of FIG. 1B are OrderType=ZOMS, SalesOrganization=2000, DistributionChannel=22, and Division=18. The parameter values 14 have been transferred to the Create Sales Order Initial Screen transaction 260 shown in FIG. 2. The OrderType field 261 has been set to the value "ZOMS" 265, the Sales Organization field 262 has been set to the value "2000" 266, the Distribution Channel field 263 has been set to the value "22" 267, and the "Division" field 264 has been set to the value "18" 268. The transaction screen 260 will be submitted to the application by the Prees_Enter element call 5 of FIG. 1B.

Two exemplary element generators 197 are described herein. The first exemplary element generator is user-interface-based, and extracts information from the application's user interface about the fields of the application's user interface to generate a test element for a particular transaction shown on an application screen. The second exemplary element generator is metadata-based, and uses metadata to generate a test element for a particular transaction. The metadata is a computer-readable description of an interface. In one aspect, the metadata is a set of field descriptions that includes a field name, type, and field properties for each field in a transaction for interacting with a business process application. The metadata is typically stored in a database associated with the application. Both approaches produce similar results, i.e., one element per transaction screen, where the element does not include buttons or menus. The choice of which approach to use may depend on the user's environment and security settings. If both approaches are available, the metadata-based approach will take precedence, because the metadata-based approach can more easily be provided as a batch (i.e., non-interactive) process, and will therefore be more suitable for generating a large number of test elements. An application such as SAP™ may have, for example, 16,000 possible transactions, in which case the metadata-based element generator can be used to generate automated test elements for the 16,000 transactions. After the test elements have been generated, a user may further modify the test elements as desired.

Figure 3:
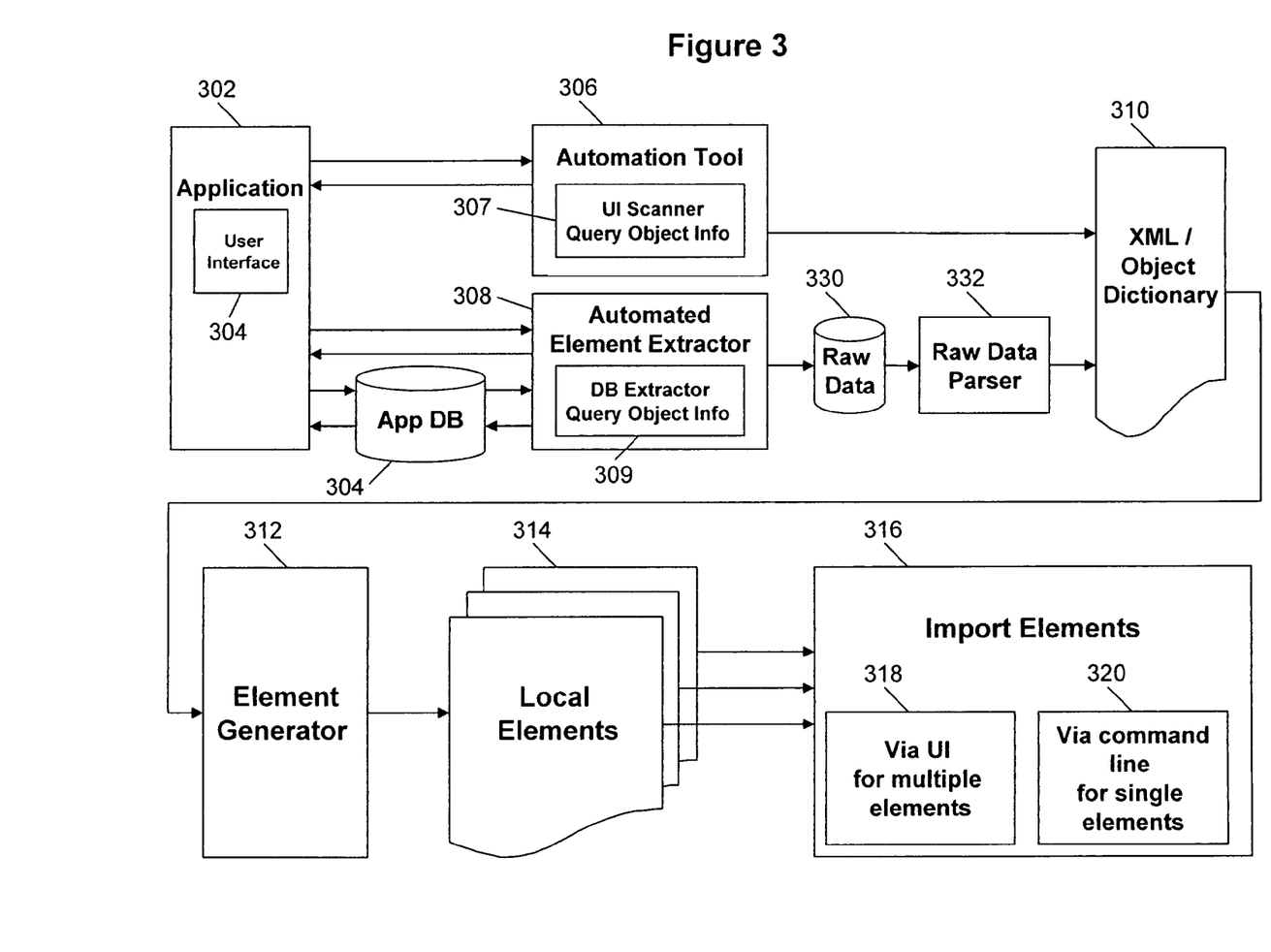
FIG. 3 is an illustrative end-to-end diagram of a process for generating test elements according to some embodiments of the invention.

FIG. 3 is an illustrative end-to-end diagram of a process for generating test elements according to some embodiments of the invention. The end-to-end process begins by extracting information describing the features to be tested from a business process application 302, e.g., SAP™, Siebel™, or the like. The features to be tested may be, for example, transactions, and the transactions may include data fields. In that example, the feature descriptions would be extracted in the form of user interface field descriptions by the automation tool 306. The user of the automation tool 306 selects an application screen while the application is running, and invokes a command to extract the description of the currently-displayed screen. For example, if the Create Sales Order Initial Screen 260 of FIG. 2 is being displayed by the application, the user of the automation tool can invoke a command to capture information about that screen, including the names and types of the data fields, such as the order type field 261.

The extraction may be performed by a user-interface (UI) scanner 307 which is, for example, a script in a test system. The test system may be, for example, QuickTest Professional™ from Mercury Interactive Corporation of Mountain View, Calif. The automation tool may be provided by the test system. In one aspect, the UI scanner 307 is computer program code to be executed by the automation tool 306. The UI scanner 307 identifies and extracts user interface objects, i.e., data fields, from the current application screen (e.g., SAP™ screen), stores information about the extracted objects in an object dictionary 310, and makes the extracted objects available to an element generator 312. The extracted objects correspond to the features to be tested for the current application screen. In one example, a single screen typically corresponds to a type of transaction, so the automation tool 306 extracts the objects to be used for testing a single type of transaction provided by the application 302.

The information describing the feature to be tested may also be extracted from an application metadata database 304 by an automated element extractor 308, which is in one aspect a computer program having a command-line user interface, a graphical user interface, or both. The automated element extractor 308 includes a database (DB) extractor 309. The DB extractor 309 may be, for example, a script which includes computer program code implemented in a language such as VBScript™, JavaScript™, Java™, or the like. In one aspect, the DB extractor 309 identifies and extracts metadata that describes fields of application transactions application database 304, stores information about the extracted objects in the object dictionary 310, and makes the extracted objects available to an element generator 312. The DB extractor 309 may generate information for multiple transaction screens of a business process application 302, e.g., SAP™, Siebel™, or the like.

The user ordinarily chooses whether to use the single-screen user interface method of the automation tool 304, which is suitable for interactive use, or the metadata-based automated element extractor 308, which can process multiple screens and is more suitable for batch invocation. The metadata-based extractor 308 is also suitable for interactive use when incorporated into a user interface.

The application database 304 contains descriptions of features, such as transactions, that are provided by the application 302. The database 304 may contain a set of records, where each record describes a type of transaction. The records may be stored in a file, such as a tab-delimited file, or in a relational database, in some other persistent storage format, or may be retrieved directly from the application 302 via, for example, a network interface. Each record may include descriptive data such as a transaction name, a screen number, and a set of field descriptions, which describe the fields, i.e., objects, which are the input and output of the transaction. Each field description typically includes a name, an application-specific name, a type, which may describe how a value can be provided for the field, an enabled flag, which indicates whether the field is enabled, and a required flag, which indicates whether the field is required.

The object dictionary 310 stores a description of each transaction of the application 302. The descriptions are extracted by the automation tool 306 or by the automated element extractor 308 from the metadata stored in the application database 304, and include copies of the transaction and field descriptions described above. In one aspect, the object dictionary 310 is represented in a standard and easily accessible, data format, such as Extensible Markup Language (XML). The object dictionary 310 decouples the application 302 and application database 304 from subsequent entities in the process flow of FIG. 3, such as the element generator 312. That is, the object dictionary 310 enables subsequent entities in the process flow of FIG. 3 to be independent of the application 302. Entities such as the element generator 312 do not rely on the availability of the application 302, i.e., can be implemented and executed without communicating with, invoking, or accessing the application 302 or the application database 304.

According to an embodiment of the invention, the object dictionary 310 is represented as a set of Extensible Markup Language (XML) documents. Each XML document describes an application transaction, such as a Create RFQ transaction in an SAP™ application named ME41 that creates a Request for Quote (RFQ). The XML document that represents the ME41 transaction includes a TCODE element that contains the transaction type, and one or more SCREEN elements that contain descriptions of one or more screens of the transaction. Each SCREEN element contains a NAME element that contains the screen name, and one or more OBJECT elements that contain descriptions of the objects, i.e., fields, of the screen. Each OBJECT element contains a NAME element, an APP_NAME element which contains an application-specific name of the object, an OBJECT_TYPE element which contains the name of a user interface component for providing a value for the field, a COMPONENT_TYPE element, contains stores the type of the component, an ENABLED element which contains a flag indicating whether the field is enabled, i.e., available for input or output, and a required field which contains a flag indicating whether the field is required. An example XML document is shown below:

```
<TRANSACTION>
  <TCODE>ME41</TCODE>
  <SCREEN>
    <NAME>Create RFQ : Initial Screen</NAME>
    <SCREEN_NUMBER>300</SCREEN_NUMBER>
    <MAIN_CONTENT>
      <OBJECT>
        <NAME>RFQ type</NAME>
        <APP_NAME>XX059</APP_NAME>
        <OBJECT_TYPE>AppGuiEdit</OBJECT_TYPE>
```

-continued

```
        <COMPONENT_TYPE>32</COMPONENT_TYPE>
        <ENABLED>True</ENABLED>
        <REQUIRED>False</REQUIRED>
      </OBJECT>
    </MAIN_CONTENT>
  </SCREEN>
</TRANSACTION>
```

Object properties may be associated with each object to be tested. These object properties may be, for example, field names, alternate field names, field types, a visible flag, an enabled flag, and the like. The example object dictionary entry shown above includes elements that represent properties, which are NAME, APP_NAME, OBJECT_TYPE, COMPONENT_TYPE, ENABLED, and REQUIRED: These object properties are stored by the UI scanner 307 or the DB extractor 309 in the object dictionary 310 for use by an element generator 312.

In one example, each object corresponding to a data field in a transaction screen is associated with a field name, which is an internal name of the object and is independent of locale, and a user interface (UI) name, which is displayed by the user-interface and is local-specific. The field name and the user interface name of each object are stored in the object dictionary as properties of that object, as can be seen in the XML example shown above. The APP_NAME element corresponds to the field name, and the NAME element corresponds to the user interface name. In that example, the locale-specific name may be derived from the NAME element by a localization module.

According to one embodiment of the invention, the automated element extractor 308 produces raw data 330, which is a representation of the objects extracted by the DB extractor 308. The raw data 330 is converted to a format such as XML and stored in the object dictionary 310 a raw data parser 332.

In one aspect the element generator 312 acquires objects describing a feature such as a transaction screen from the object dictionary 310. The element generator 312 converts the objects, which may be, for example, XML documents, to corresponding local elements 314. The element generator 312 generates instructions for the local elements 314by, for example, generating an instruction for interacting with, i.e., setting and getting the value of, each screen field in the transaction screen The local elements 314 are implementations of the test elements 196 of FIG. 1A The local elements 314 provide a programmatic interface for invoking the particular features of the business process application 302, thereby enabling automated testing of the business process application 302. In one aspect, the local elements 314 interact with the user interface of the business process application 302 by simulating user input to the application 302 and converting output data values displayed by the application 302 to objects or variables in a programming language interface.

According to an embodiment of the invention, each of the local elements 314 includes computer program code that may accept one or more parameter values as input. The parameters may be received from invoking program code such as a business process test. The local element invokes a feature of the application 302, passing the parameter values to the application 302 as part of the invocation. In one aspect, the local element sets user interface fields of a transaction screen of the application 302 to corresponding parameter values.

An example of local element code for setting a field of the Create RFQ transaction type is shown below:
ExecuteFile "Init.vbs.txt"
'Setting field RFQ type
val=getVal(Parameter("RFQ_type"))
Set_Text "RFQ type", val This local element code is implemented as a script in the VBScript™ programming language. The element code may be stored in temporary or permanent storage, such as memory, a file, or a database. This element code first executes a shared file that contains computer program code statements for initializing the element. Then the element script retrieves a value of a parameter named RFQ_type, and invokes a Set_Text subroutine to set the value of a field named "RFQ type" to the value of the parameter. Note that the local element is generated by the element generator 312 using the information in the object dictionary 310. The getVal and Set_Text subroutine calls in the element are generated for each OBJECT element, i.e., field, described in the object dictionary 310. The element generator 312 typically generates the following two statements for each OBJECT element that can contain text values:
val=getVal(Parameter(NAME))
Set_Text NAME, val Set_Text sets the value of a text field. Similar statements may be generated for setting OBJECT elements that can contain other types of values, such as Boolean flags, values chosen from a menu, and the like, by invoking an appropriate Set method in the text.

A business process application test environment may receive the input parameter values to be passed to the test element directly from the user, or from a spreadsheet, data file, data base, network service, or other data source. The test environment typically uses a description of the names of the parameters of a transaction to determine the number and names of input parameters to be supplied to a transaction. This description of transaction parameters is part of the local elements 314 and is generated by the element generator 312. The description may include a list of input parameter names and a list of output parameter names, and may be stored as a file that is read by the business process test environment. For example, if a transaction screen contains a single field named RFQ_type, then the following parameter description file would be generated:
[IN]
RFQ_type=

That parameter description file describes a single input parameter named RFQ_type.

A set of test elements for interacting with substantially every feature of a business process application 302 may be generated as described above. A set of such statements for a particular transaction type's screen may be stored as a file associated with that screen. A set of such files, one for each screen, may be associated with the particular transaction type. The element generator 312 is therefore able to generate local elements 314 for interacting with substantially every feature, e.g., transaction type, of the business process application 302. The local elements 314 can be used by business process tests to test any desired set of features of the application 302 for which elements 314 have been defined. The local elements 314 may be imported into a business process test environment before use, as described below.

An element import component 316 imports the local element 314 into a business process test environment to make the test elements available for invocation by business process tests. The import component 316 may have a graphical user interface 318 for importing multiple elements. The import component 316 may also have a command line interface 320 for importing single elements.

Figure 4:
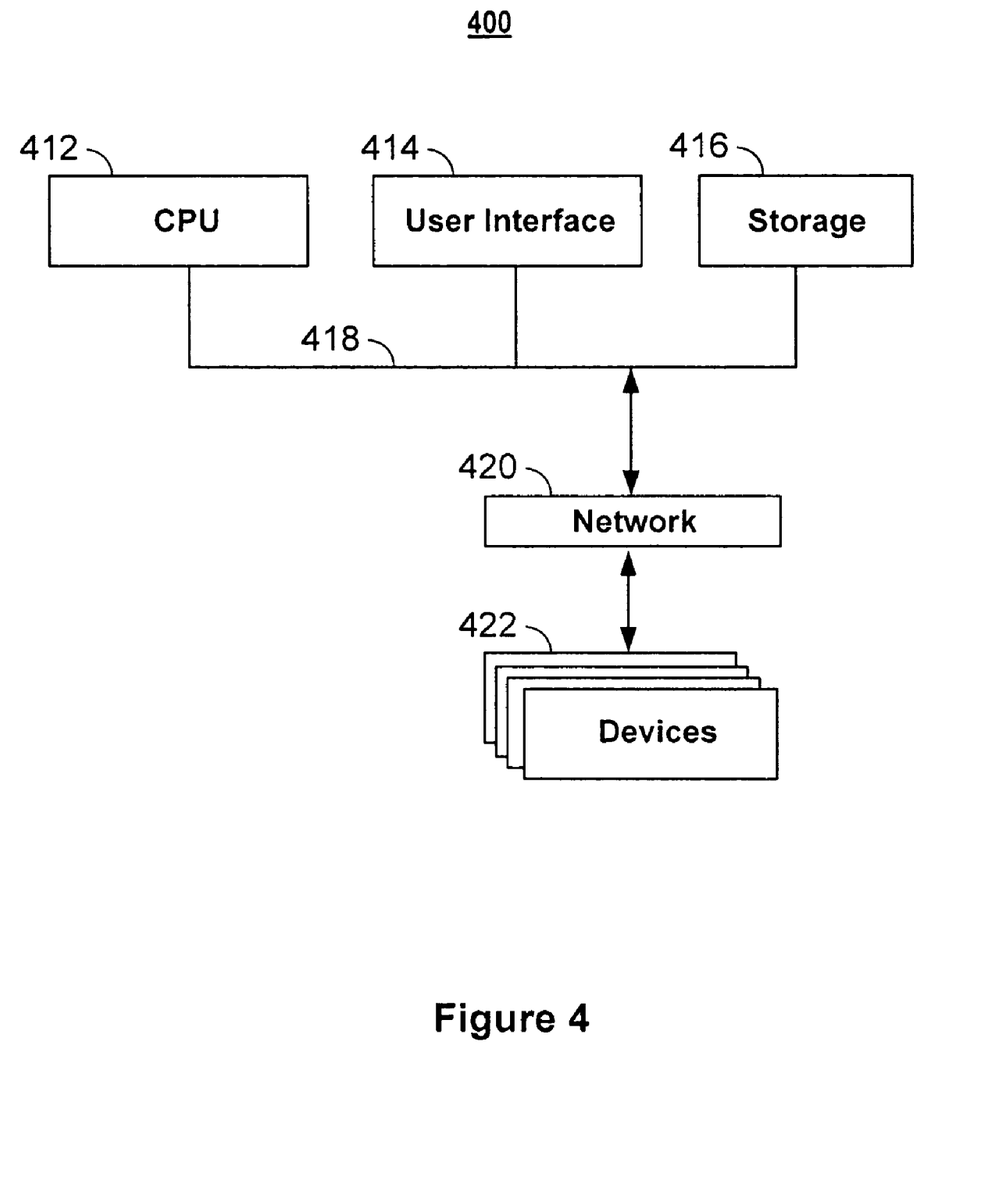
FIG. 4 is a schematic drawing of an illustrative computer system that can run novel processes for generating and validating constraints in accordance with embodiments of the invention.

FIG. 4 is a schematic drawing of an illustrative computer system 400 that can run novel processes for generating and validating constraints in accordance with embodiments of the invention. The computer system 400 includes one or more central processing units (CPU's) 412, a user interface 414, computer readable storage media 416, a system bus 418, and one or more bus interfaces for connecting the CPU, user interface, memory and system bus together. The computer system also includes a network interface 420 for communicating with other devices 422 on a computer network.

Figure 5:
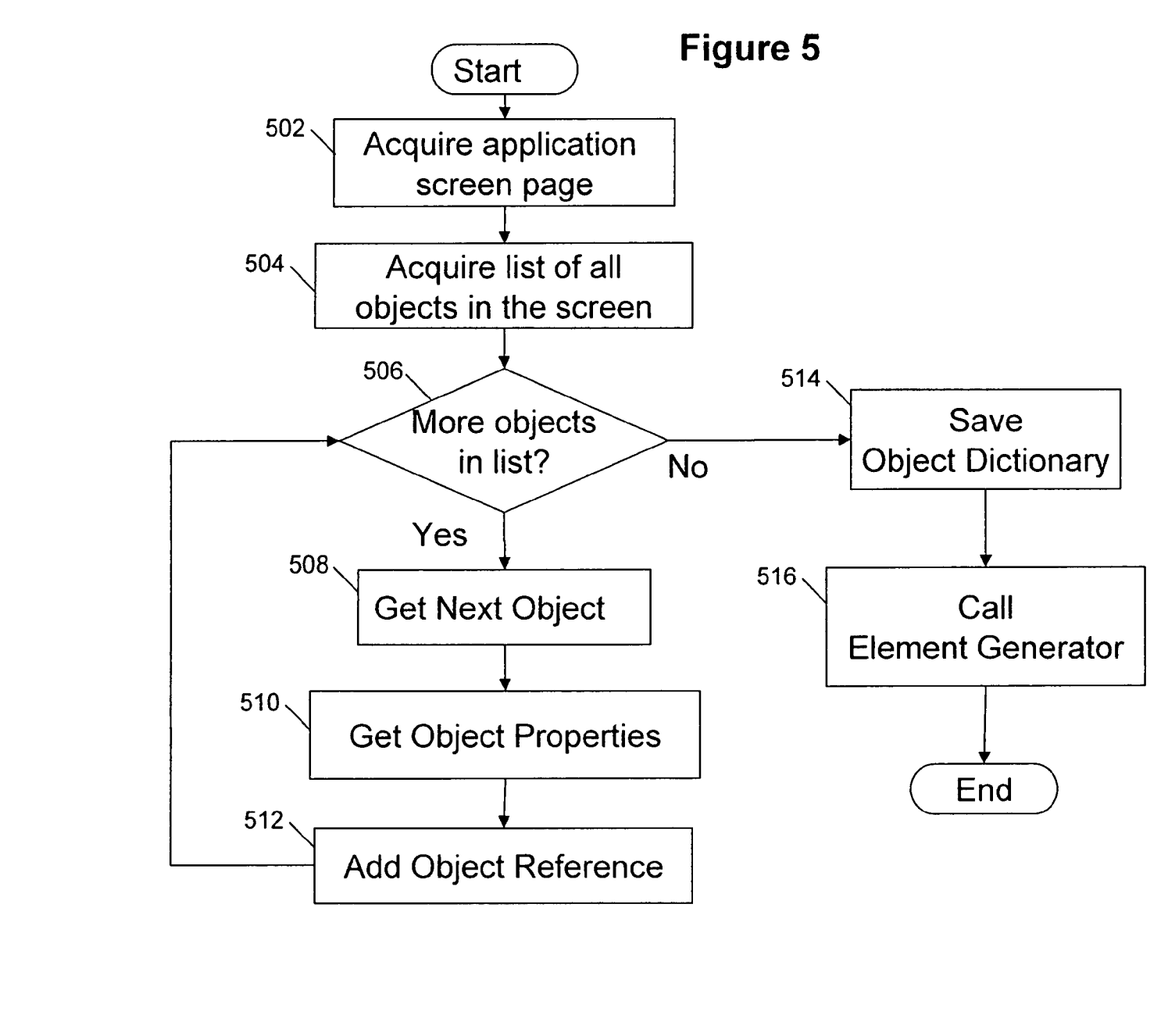
FIG. 5 is an illustrative flowchart of a process for extracting objects describing application features from an application user interface according to some embodiments of the invention.
Figure 6:
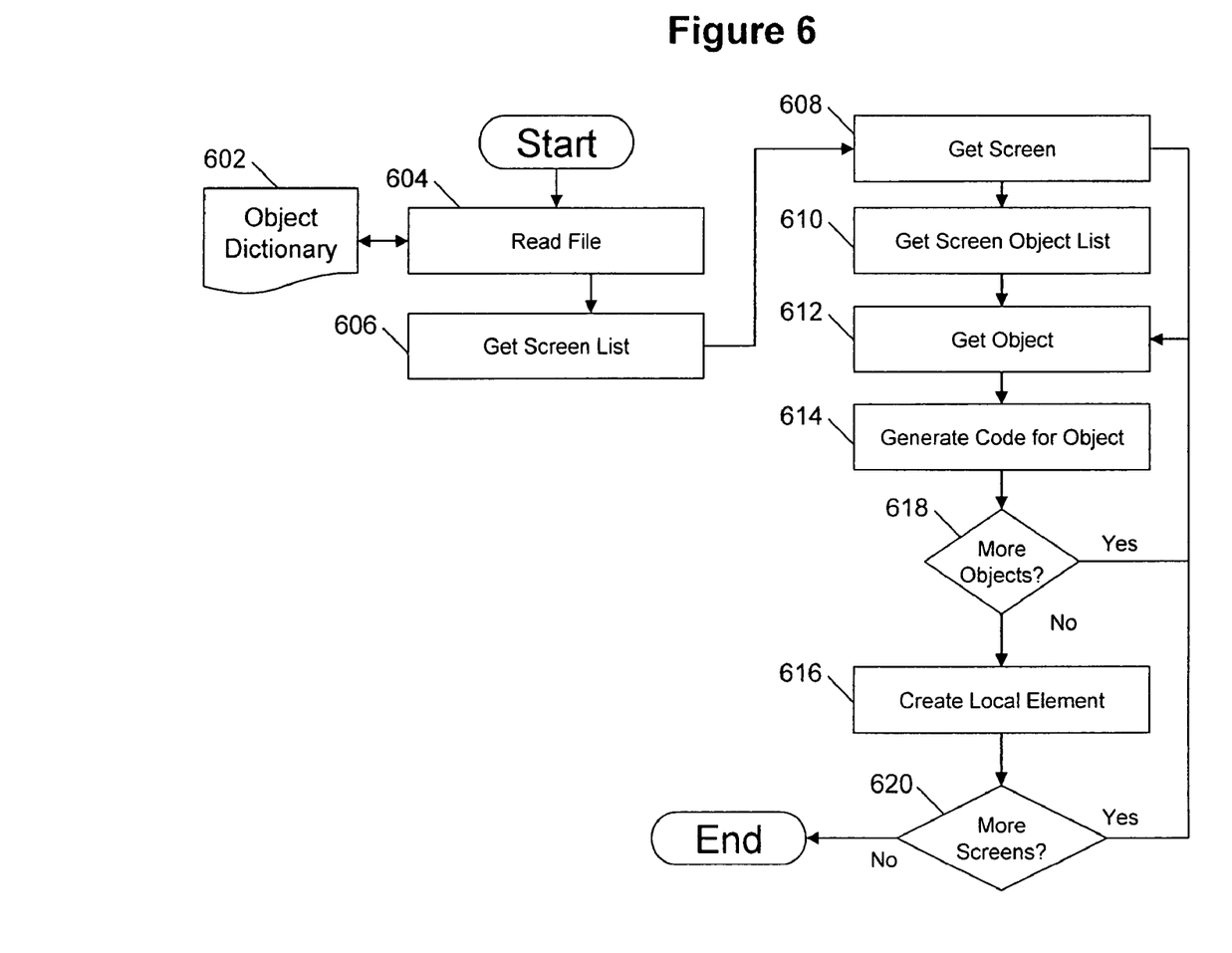
FIG. 6 is an illustrative flowchart of a process for generating test elements according to some embodiments of the invention.
Figure 7:
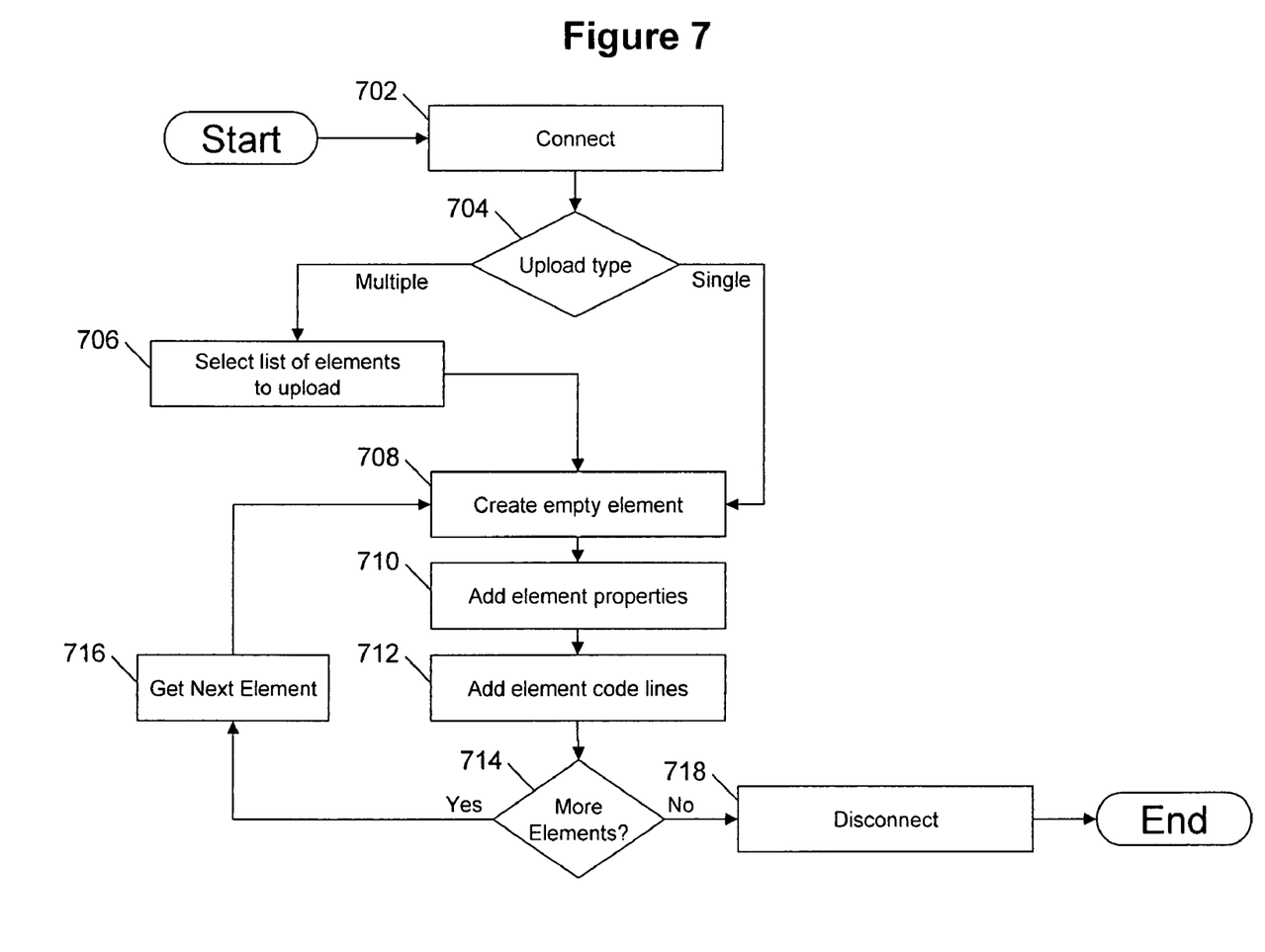
FIG. 7 is an illustrative flowchart of a process for importing test elements into an element repository according to some embodiments of the invention.

Computer-readable code for implementing the business process test environment of FIGS. 1A and 1B, the object extraction process of FIG. 5, the test element generation process of FIG. 6, and test element import process of FIG. 7 can be stored in the storage memory 416 and used to control the CPU 412. Moreover, a data structure representing the business process test 170 and the test elements 196 of FIG. 1A can be stored in the storage memory 416. The computer program instructions can cause the CPU 412 to generate the test elements 196 of FIG. 1A, and to import the test elements into the test development environment 190 for use by the business process test 170.

FIG. 5 is an illustrative flowchart of a process for extracting objects describing application features from an application user interface according to some embodiments of the invention. The extraction process shown in FIG. 5 corresponds to the UI scanner 307 of FIG. 3, and may be implemented as computer program code encoded in a computer memory 816, as shown in the system 400 of FIG. 4. The flowchart begins at block 502 by acquiring an application screen page, which may be, for example, a screen of a transaction, such as a transaction for creating a new purchase order. Block 504 acquires a list of objects that appear on the screen page. The list of objects may be, for example, a list of user interface objects that represent fields of the transactions, such as text boxes, menus, check boxes, and the like. Types of objects that represent fields of the transaction are, in one aspect, objects that receive values from a user, i.e., input objects such as text boxes, menus, check boxes, and the like, or objects that provide values to a user, i.e., output objects such as labels. Block 506 determines if there are more objects in the list of objects on the screen page. If there are more objects, the flowchart gets the next such object at block 508. The object properties of the next object are acquired at block 512. The object properties are typically a name, a type, a visible flag, an enabled flag, and a required flag that are associated with the object by the application. An object reference is added to the object dictionary at block 512. The object reference added to the object dictionary may include, for example, the following properties: a name of the object, an application name, i.e., screen name, of the object, a type of the object, a component type of the object, an enabled flag, and a required flag. These properties correspond to the properties described above with reference to the object dictionary 310 of FIG. 3.

If block 506 determines that there are no more objects in the list of objects, block 514 saves the object dictionary, e.g. as an XML-format disk file, and block 516 invokes the element generator to convert the objects in the object dictionary to test elements.

The extraction process of FIG. 5 is typically executed by a user or a developer of a test system when support for testing a particular type of transaction is to be added to the test system, which can occur, for example, when new transactions or a new application becomes available. The extraction process need not be executed every time a test is run, although there is no restriction on the frequency of execution of the extraction process.

FIG. 6 is an illustrative flowchart of a process for generating test elements according to some embodiments of the invention. The process for generating test elements corresponds to the element generator 312 of FIG. 3, and may be implemented as computer program code encoded in a computer memory 816, as shown in the system 400 of FIG. 4. The flowchart begins at block 604 by reading an object dictionary file 602. The flowchart continues at block 606 by acquiring a screen list from the object dictionary file 602 read in block 604. Block 608 by selects a particular screen from the screen list. Block 610 selects a list of objects on the particular screen. Block 612 acquires a particular object, e.g., field, in the list of objects.

Block 614 generates element code, i.e., instructions of the test element, for interacting with the particular field. Block 614 may, for example, generates VBScript™ code lines and add the code lines to a file. The code lines are generated in the format:

val =getVal(Parameter("<FieldLabel>"))

<SetMethod>"<FieldLabel>", val

The first line retrieves a value for the field from the input parameters of the test element. The FieldLabel portion of the first line is different for each field; the other portions of the line remain constant, although a method other than getval may be used for types that do not support getVal.

The second line sets the application field referred to by FieldLabel to the value retrieved in the first line. SetMethod is a method, such as Set_Text, which is selected by block 614 based upon the type of the field. The type of the field is specified by the COMPONENT_TYPE element of the object dictionary entry for the field. Set_Text is generated if the field is a text field. Set methods for other types of fields, such as list boxes or check boxes, may also be generated, as specified by the COMPONENT_TYPE. FieldLabel is the user interface name of the field, which is specified by the object's NAME element in the object dictionary. The parameter "val" is a parameter name that refers to an input parameter of the test element. The parameter name "val" is generated for most field types, although multiple parameter names, e.g., "val1, val2" could be generated for set methods that accept multiple parameters.

The flowchart continues at block 618 by determining if there are more objects in the list of objects. If so, the next object is processed by block 612 and 614, so that code is generated for each object on the screen. If not, a local element, i.e., a test element for the screen that was just processed, is generated, i.e., written to a file or other storage device, at block 616. Next, block 620 determines if there are more screens in the screen list. If so, the next screen is processed by repeating blocks 608-618. Otherwise, the flowchart ends.

FIG. 7 is an illustrative flowchart of a process for importing test elements into an element repository according to some embodiments of the invention. The import process of FIG. 7 corresponds to the import elements block 316 of FIG. 3, and may be implemented as computer program code encoded in a computer memory 816, as shown in the system 400 of FIG. 4. FIG. 1A shows an element repository 198, which is typically a database, file, or computer memory. The element repository 198 stores test elements that are imported into the business test environment 191 of FIG. 1A. The element repository 198 is typically a portion of the business process test environment 191. The element repository 198 may be provided by, for example, Quality Center™ from Mercury Interactive Corporation of Mountain View, Calif.

The flowchart begins at block 702 by connecting to the element repository. Block 704 determines if an upload type specified as an input parameter is Multiple or Single. Single indicates that a single element is to be uploaded, i.e., imported, and Multiple indicates that multiple elements are to be uploaded. If the upload type is multiple, a list of elements to be imported is acquired, e.g., as an input parameter, at block 706. In either case, at least one XML element from the object repository 310 of FIG. 3 is provided to the import process as input. Block 708 begins the process of creating new repository elements and adding them to the repository by first creating a new empty element, which is typically represented as an object in a programming language. Block 710 adds the properties of an XML element, e.g., the values of the NAME, APP_NAME, OBJECT_TYPE, COMPONENT_TYPE, ENABLED, and REQUIRED sub-elements, to the new repository element. Block 712 adds the element code lines generated at block 614 of FIG. 6 to the repository element. Block 714 determines if the input of the import process contains more XML elements. If so, block 716 gets the next element and repeats the process of adding the element to the repository in blocks 708-714. If block 714 determines that the input contains no more XML elements, then block 718 disconnects from the repository and the flowchart ends.

The above description is exemplary only and it will be apparent to those of ordinary skill in the art that numerous modifications and variations are possible. For example, various exemplary methods and systems described herein may be used alone or in combination with various other computer and computer peripheral systems and methods. Additionally, particular examples have been discussed and how these examples are thought to address certain disadvantages in related art. This discussion is not meant, however, to restrict the various examples to methods and/or systems that actually address or solve the disadvantages.

What is claimed is:

1. In a business process test environment, a method of generating a business process test element for testing a business process transaction provided by a business process application, the method comprising the steps of:

acquiring a description of a transaction field from a component of the business process application, wherein the description comprises a name and a type of the field; and generating an instruction for setting a field value associated with the field to an input value, wherein the input value is acquired by the instruction when the instruction is executed, and wherein the instruction is based upon the name and the type.

2. The method of claim 1, wherein acquiring a field description comprises:

extracting a user interface object from an application screen, wherein the user interface object corresponds to the transaction field; and determining the name and the type based upon the user interface field.

3. The method of claim 2, wherein the user interface object comprises a text box, list box, drop down, check box, radio box, or a combination thereof.

4. The method of claim 1, wherein acquiring a field description comprises:

retrieving metadata associated with the business process application, wherein the metadata describes the transaction; and determining the name and the type based upon the metadata.

5. The method of claim 1, wherein generating instructions comprises:
acquiring a display label from the description of the transaction field, wherein the display label is associated with a user interface object that corresponds to the transaction field, establishing an association in an object definition list between the name and the display label;
wherein generating an instruction comprises:
generating an instruction for providing the input value to the user interface object, wherein the display label identifies the user interface object.

6. The method of claim 1, wherein a data file provides the input value.

7. The method of claim 1, wherein a spreadsheet provides the input value.

8. The method of claim 1, wherein generating an instruction further comprises:
generating an instruction for retrieving a current value of the transaction field.

9. The method of claim 1, further comprising the step of:
importing the business process test element into a business process test environment to make the test element available for invocation by business process tests.

10. The method of claim 1, further comprising the step of:
updating a spreadsheet to reference the transaction field by linking a spreadsheet cell to the transaction field.

11. A system for generating a business process test element for testing a business process transaction in a business process test tool, comprising:
a means for acquiring a description of a transaction field from a component of the business process application, wherein the description comprises a name and a type of the field; and
a means for generating an instruction for setting a field value associated with the field to an input value, wherein the input value is acquired by the instruction when the instruction is executed, and wherein the instruction is based upon the name and the type.

12. A computer program product embodied in a computer storage medium comprising program code for generating a business process test element for testing a business process transaction provided by a business process application, the computer program product comprising: program code operable to acquire a description of a transaction field from a component of the business process application, wherein the description comprises a name and a type of the field; and program code operable to generate an instruction for setting a field value associated with the field to an input value, wherein the input value is acquired by the instruction when the instruction is executed, and wherein the instruction is based upon the name and the type.

* * * * *